(12) United States Patent  
Sowlati

(10) Patent No.: US 6,952,567 B2  
(45) Date of Patent: Oct. 4, 2005

(54) ENVELOPE ERROR EXTRACTION IN IF/RF FEEDBACK LOOPS

(75) Inventor: Tirdad Sowlati, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 14 days.

(21) Appl. No.: 10/672,903

(22) Filed: Sep. 26, 2003

(65) Prior Publication Data

US 2005/0070233 A1 Mar. 31, 2005

(51) Int. Cl.$^7$ ................................................ H04B 1/04
(52) U.S. Cl. ................................. 455/114.2; 455/126
(58) Field of Search .......................... 455/114.2, 114.3, 455/126, 127.1, 296, 303, 308, 311; 375/296, 297

(56) References Cited

U.S. PATENT DOCUMENTS 5,584,059 A  * 12/1996  Turney et al. ............... 455/126  
6,449,465 B1 *  9/2002  Gailus et al. ................ 455/126

* cited by examiner

Primary Examiner—Nguyen T. Vo  
(74) Attorney, Agent, or Firm—Thomas, Kayden, Horstemeyer & Risley, LLP

(57) ABSTRACT

A system for detecting and extracting a signal envelope is disclosed. Embodiments of the invention provide for substantially linear operation and a low DC offset that is contributed generally by mismatch of a differential resistor.

25 Claims, 6 Drawing Sheets

| COMPONENT | MIS-MATCH | OUTPUT DC OFFSET (mV) | mV² |
|---|---|---|---|
| RLOAD (40,000 uM^2) | 0.10% | 0.7 | 0.49 |
| SWITCHING CORE Vbe x 4 | 0.6 mV | 0.7 | 0.49 |
| V-I (X 2) | 0.50% | 0.098 | 0.009604 |
| Rbuff bias (2000 uM ^2) | 0.50% | 0.15 | 0.0225 |
| OUTPUT BUFFER Vbe | 0.6 mV | 0.07 | 0.0049 |
| LIMITER | 6 mV | 0.02 | 0.0004 |
| INPUT Vbe | 1.8 mV | 0.03 | 0.0009 |
| | | mV^2 | 1.018304 |
| | | Total RMS Offset (mV) | 1.00911 |

FIG. 6

ENVELOPE ERROR EXTRACTION IN IF/RF FEEDBACK LOOPS

BACKGROUND OF THE INVENTION

1. Field of the Invention

This invention relates generally to a transmitter architecture. More particularly, the invention relates to an envelope detection and error extraction system in a feedback system.

2. Related Art

Handheld, telephone-like communication handsets, also referred to as portable transceivers, have enjoyed widespread popularity. Part of the reason for this popularity is that a portable transceiver offers a user a variety of capabilities and features, such as Internet access, built-in camera functionality, in addition to traditional telephony functionality. As more features and capabilities are added, portable transceivers need to utilize power more efficiently while maintaining satisfactory performance.

One obstacle to satisfactory performance and efficient power utilization is direct current (DC) offset. DC offset refers to the DC voltage that can occur at the output of a system when there is a zero voltage input applied to the input, or if there are two identical input signals applied, as in the case of a differential input. In an ideal system having a differential input, zero voltage applied to the input terminals, or identical signals applied to the differential input terminals results in an output signal of zero volts. In EDGE modulation, for example, DC offset in the loop can degrade performance of portable transceivers. DC offset causes unwanted signals to appear in adjacent channel frequencies, limiting the number of users that can use portable transceivers in a defined area and/or preventing users from even receiving a call in some circumstances. DC offset can also corrupt the channel (e.g., signal propagating frequency or bandwidth) the user is transmitting on, thus increasing the processing time at the portable transceiver required to accurately receive the signal.

More particularly, DC offset can obscure received signals, especially at low-signal levels, often resulting in fundamental limitations in EDGE PAC (Enhanced Data Rates for GSM Evolution Power Amplifier Controller) systems, among other systems that require a defined threshold difference between detected signal level and DC offset. Further, solutions to DC offset often introduce non-linearity at low-signal levels, add increased componentry (and thus consume more space and power), and may add to the complexity (and cost) of a system.

As a way of explaining the effects of DC offset on portable transceiver systems, consider the simplified block diagram of FIG. 1. FIG. 1 is a block diagram that shows an amplitude feedback system 100, which can be part of a polar-loop transmitter architecture. In a typical portable transceiver device, the gain of an intermediate frequency (IF) variable gain amplifier (VGA) is adjusted to control the output power of a power amplifier (in a manner as described below), and a baseband (BB) VGA is typically used to compensate for the gain changes of the IF VGA. This combination of an IF VGA and a BB VGA is implemented in an attempt to provide constant gain (and thus feedback loop stability) and to also avoid spectral regrowth. Note that spectral regrowth is not allowed in certain standards for wireless communications.

Although single lines are shown as connections to the various components in FIG. 1, it is understood to those having ordinary skill in the art that the connections can include differential inputs. The amplitude feedback system 100 can be part of a transmitter portion of a portable transceiver. As shown in FIG. 1, the amplitude feedback system 100 includes a detection system 101, a subtraction system 102, a BB VGA 103, a power amplifier (PA) 105, an IF mixer 107, and an IF VGA 109. The detection system 101 receives a voltage, $V_{ref}$, at node 111. $V_{ref}$ comprises varying amplitude information received from a modulator, such as an In-Phase-Quadrature (I/Q) modulator (not shown), and other processing components to be described below. The detection system 101 also receives a feedback voltage, $V_{fb}$, over connection 121 from the IF VGA 109. The subtraction system 102 subtracts detected signals (e.g., voltages corresponding to the envelope) of $V_{fb}$ from $V_{ref}$ and provides the resulting signal (with or without gain) to the BB VGA 103 over connection 113. The output signal of the BB VGA 103 is input to the PA 105 over connection 115, which generates an output $V_{out}$ at node 117. $V_{out}$ of the PA 105 can be fed back to the IF mixer 107.

The IF signal output over connection 119 is input to the IF VGA 109, which outputs a signal over connection 121 back to the detection system 101 to close the loop. The gain of the IF VGA 109 and the BB VGA 103 are inversely proportional to one another, and thus the open loop gain is constant versus VGA gain. The IF VGA 109 has a gain variation in a direction opposite that of the BB VGA 103 to attempt to maintain the loop gain relatively constant. Otherwise the system will be unstable. Therefore, if the gain in the feedforward path is large, the output ($V_{out}$) is controlled by the gain in the feedback path. The output signal of the PA 105 is directly related to the gain (and amplitude variation) of the IF VGA 109. For example, if the IF VGA gain is large, the PA output power is small. If the IF VGA gain is small, the PA output power will be large.

The structure and corresponding functionality of the detection system 101 includes two detectors for detecting the envelope of the IF signal ($V_{fb}$). The subtraction system 102 compares the detected envelope of the IF signal with the detected envelope of a reference signal ($V_{ref}$). Diode rectification (either full-wave rectification or half-wave rectification) followed by a voltage or current subtraction is used. For example, in EDGE PAC systems, the envelope of the IF input is compared with the envelope of a reference signal. Then, full-wave rectification followed by linear-voltage subtraction is implemented.

As described briefly above, two problems that often occur with this approach is a relatively large DC offset and non-linearity at low-signal levels, the latter due primarily to the exponential nature of diode operation.

D.C. offset can be caused by a mismatch in the components of the detection system 101 and subtraction system 102, and generally ranges from a few percent (e.g., ½ to 2%). Designers often account for mismatch by determining the statistical probability of the mismatch among components, and then employ DC offset correction circuitry if needed. DC offset correction can be implemented in analog and/or digital circuitry, as is well known in the art. A problem associated with DC offset correction is that the circuitry needed must be accommodated within a defined area, which given the desire for smaller portable transceivers with multiple features, creates a space-usage problem for designers. Further, responsiveness is also a desirable feature of portable transceivers, yet DC offset correction often consumes excessive processing time.

Thus, it would be desirable to have an architecture or system that detects the amplitude variations in a feedback loop and extracts the signal error (e.g., amplitude error) while minimizing DC offset and improving linearity.

SUMMARY OF THE INVENTION

Embodiments of the invention include an envelope detection and error extraction system. In one embodiment, the envelope detection and error extraction system includes functionality for providing a first chopping signal derived from a first signal, removing amplitude variation from the first signal without substantially disturbing a phase relationship between the first signal and the first chopping signal, and multiplying the first signal with the first chopping signal to produce a first rectified signal and to upconvert in frequency direct current offset from mismatch corresponding to the process of providing, removing, and multiplying.

Related methods of operation are also provided. Other systems, methods, features, and advantages of the invention will be or become apparent to one with skill in the art upon examination of the following figures and detailed description. It is intended that all such additional systems, methods, and features, and advantages be included within this description, be within the scope of the invention, and be protected by the accompanying claims.

BRIEF DESCRIPTION OF THE FIGURES

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 6 is a chart illustrating direct current (DC) offset contributions of components of the detection/error extraction system shown in FIG. 5.

DETAILED DESCRIPTION

Figure 1:
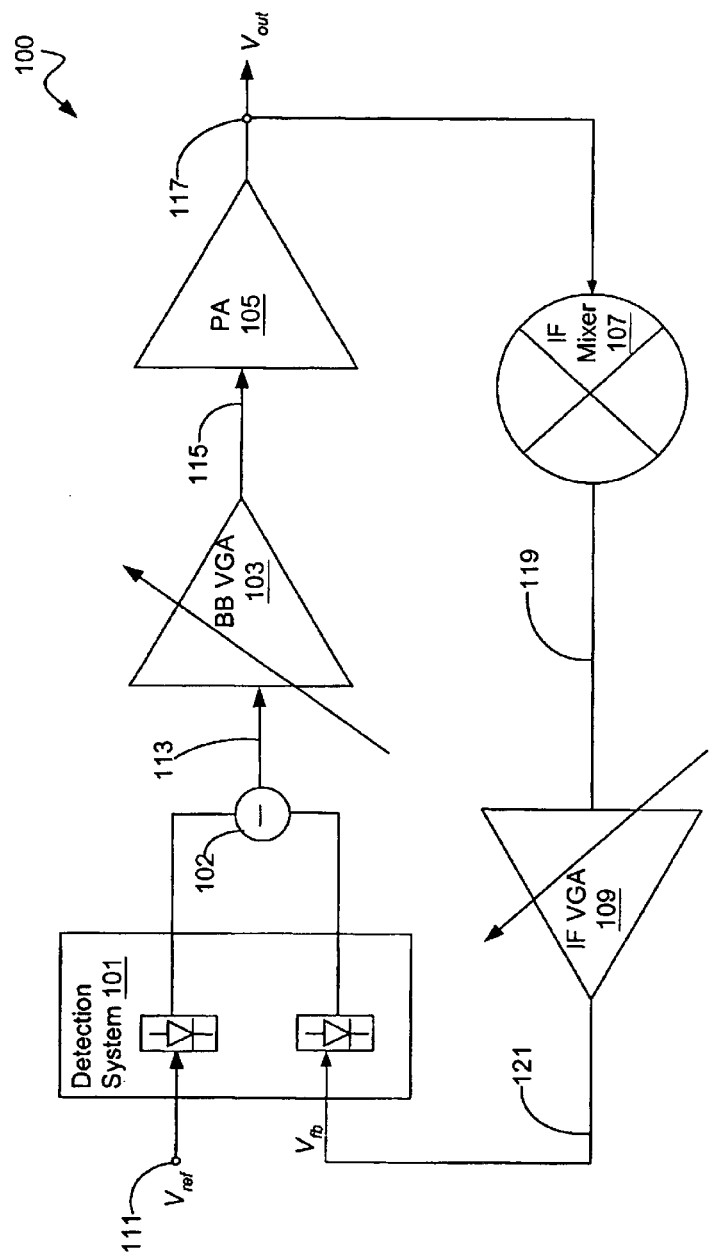
FIG. 1 is a block diagram of a conventional amplitude feedback system.

Embodiments of a detection/error extraction system are disclosed. Although described with particular reference to a portable transceiver, the detection/error extraction system can be implemented in practically any system that carries information using modulation schemes implementing phase and/or amplitude variation, and/or in systems that use a feedback control loop. The description that follows will describe an example implementation for the detection/error extraction system. Additional embodiments are then described for a detection/error extraction system that provides improved synchronous detection merged with error extraction. The synchronous detection of the detection/error extraction system provides for low AM-to-PM (amplitude modulation to phase modulation) (e.g., less than two degrees) distortion and/or delay matching. Error extraction includes extracting the signal (e.g., amplitude) error between two envelopes of either a RF (radio frequency) or an IF (intermediate frequency) signal.

In conventional systems, full-wave rectification is typically used based on the modulating signal. For example, in amplitude modulation, attention is directed to the change in amplitude, and not the carrier wave. In synchronous detection, as used in the embodiments described herein, the input signal is multiplied with itself (and ideally in phase). As is known, $\sin \omega t \times \sin \omega t$, for example (where $\omega$ represents frequency of the sinusoid and t is a variable representing time), is equivalent to $\sin 2\omega t$ plus a constant, the latter of which represents a direct current (DC) component. Somewhat similar to the operation of mixers, in the embodiments described herein, the input signal is multiplied by itself to obtain a DC component and a signal having a frequency that is twice the value of the frequency of the input signal. If performed such that the two signals being multiplied are in phase, the desired output signal is achieved. If out of phase, then the desired output signal is not achieved.

Included in one or more of the disclosed embodiments is a limiter element that strips off amplitude variations (the envelope), provides a square wave with crisp (e.g., sharp) transition edges, and provides for low AM-to-PM distortion (e.g., the limiter element removes the amplitude variation without substantially disturbing the phase). Also included is a linear buffer/delay element that compensates for delays that occur in the path of the limiter element. The limiter element and the linear buffer/delay element provide for high linearity and low direct current (DC) offset for the system. Error extraction is achieved in the current domain by subtracting the current generated from switching-core elements used for the input signal and a reference signal. The resulting current is passed through a differential resistor, thus converting the current to voltage. The DC offset of the entire detection/error extraction system is primarily determined by the matching of the physical characteristics of the aforementioned differential resistor. Mismatch due to other components gives rise to a DC offset that is converted (e.g., upconverted) in frequency via the switching nature of the detection portion of the detection/error extraction system, and therefore the DC offset can be filtered out.

The detection/error extraction system described in further detail below replaces the functionality of the diode detectors with synchronous detection, provides a low, 3-sigma DC offset that meets or exceeds EDGE PAC system requirements, among others, and reduces the overall space or area consumption due in part to requiring no DC offset correction circuitry.

Figure 2:
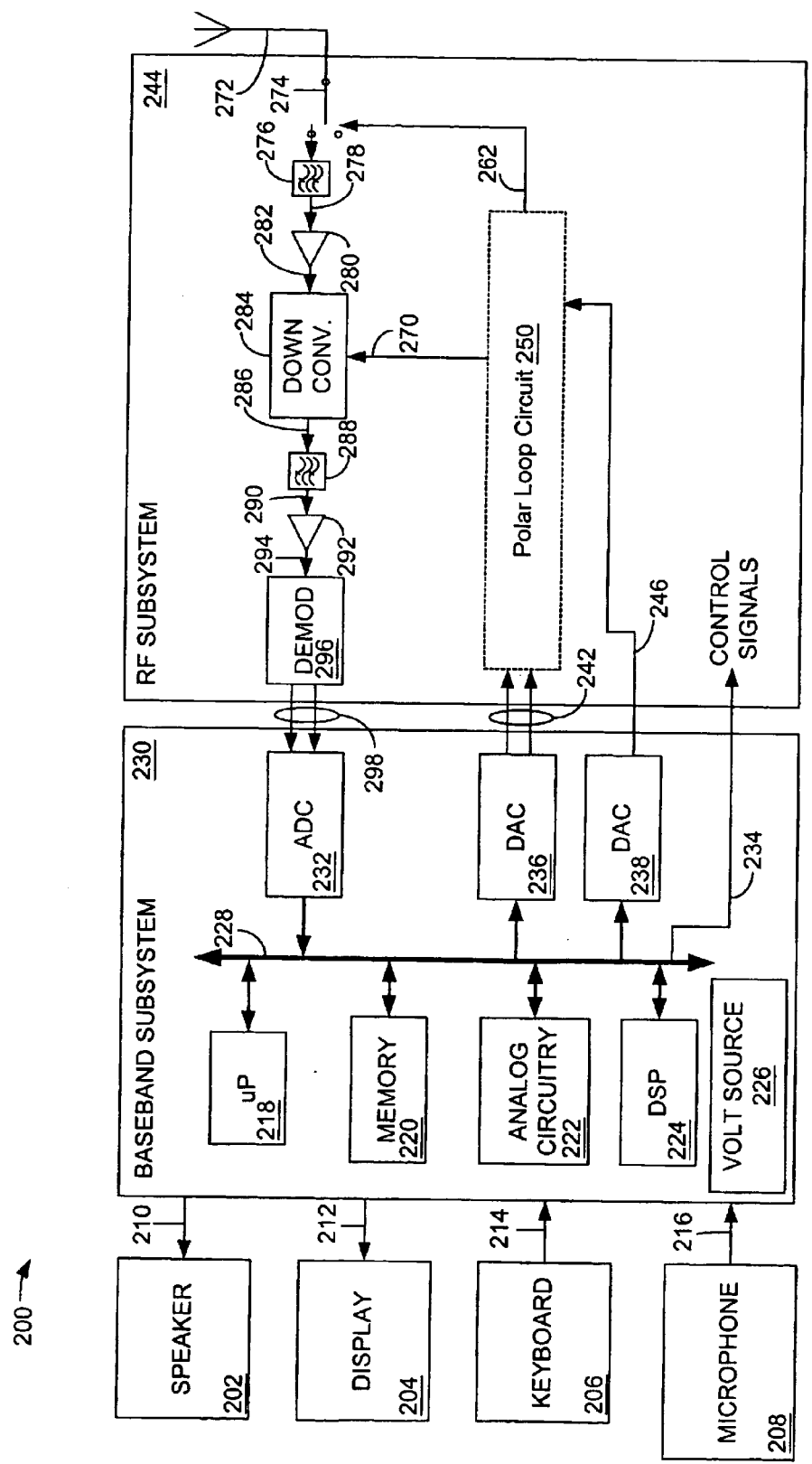
FIG. 2 is a block diagram illustrating an embodiment of a portable transceiver.

FIG. 2 is a block diagram illustrating an example portable transceiver 200. The portable transceiver 200 includes a speaker 202, display 204, keyboard 206, and microphone 208, all connected to a baseband subsystem 230. In a particular embodiment, the portable transceiver 200 can be, for example but not limited to, a portable telecommunication device such as a mobile/cellular-type telephone. The speaker 202 and the display 204 receive signals from the baseband subsystem 230 via connections 210 and 212, respectively. Similarly, the keyboard 206 and the microphone 208 supply signals to the baseband subsystem 230 via connections 214 and 216, respectively. The baseband subsystem 230 includes a microprocessor (ALP) 218, memory 220, analog circuitry 222, and a digital signal processor (DSP) 224 in communication via bus 228. The bus 228, although shown as a single bus, may be implemented using multiple busses connected as necessary among the components within the baseband subsystem 230. The microprocessor 218 and memory 220 provide the signal timing, processing and storage functions for the portable transceiver 200. The analog circuitry 222 provides the analog processing functions for the signals within the baseband subsystem 230. The baseband subsystem 230 provides control signals to a radio frequency (RF) subsystem 244 via connection 234. Although shown as a single connection 234, the control signals may originate from the DSP 224 and/or from the microprocessor 218, and are supplied to a variety of points within the RF subsystem 244. It should be noted that, for simplicity, only the basic components of the portable transceiver 200 are illustrated herein.

The baseband subsystem 230 also includes an analog-to-digital converter (ADC) 232 and digital-to-analog converters (DACs) 236 and 238. Although DACs 236 and 238 are illustrated as two separate devices, it is understood that a single digital-to-analog converter may be used that performs the function of DACs 236 and 238. The ADC 232, DAC 236 and DAC 238 also communicate with the microprocessor 218, memory 220, analog circuitry 222 and DSP 224 via bus 228. The DAC 236 converts the digital communication information within baseband subsystem 230 into an analog signal for transmission to the RF subsystem 244 via connection 242. The DAC 238 provides gain control (e.g., single-ended or differential input control voltages) to one or more IF VGAs and BB VGAs (not shown) of a polar-loop circuit 250 via connection 246. Connection 242 includes in-phase ("I") and quadrature ("Q") information that is to be input into a modulator (not shown) of the polar-loop circuit 250.

The RF subsystem 244 includes the polar-loop circuit 250, which provides modulation, amplification and/or transmission functionality for the RF subsystem 244. The polar-loop circuit 250 provides an amplified signal to an antenna 272 via connection 262 and a switch 274. Illustratively, the switch 274 controls whether the amplified signal on connection 262 is transferred to the antenna 272 or whether a received signal from the antenna 272 is supplied to a filter 276. The operation of the switch 274 is controlled by a control signal from the baseband subsystem 230 via connection 234. Alternatively, the switch 274 may be replaced by a filter pair (e.g., a duplexer) or a diplex filter that allows simultaneous passage of both transmit signals and receive signals, as known in the art. Although not shown, a portion of the amplified transmit signal energy on connection 262 is supplied to a mixer (not shown) of the polar-loop circuit 250.

A signal received by the antenna 272 will be directed to the receive filter 276. The receive filter 276 will filter the received signal and supply the filtered signal on connection 278 to a low noise amplifier (LNA) 280. The receive filter 276 is a band pass filter, which passes all channels of the particular cellular system in which the portable transceiver 200 is operating. As an example, for a 900 mega-Hertz (MHz) GSM (Global System for Mobile Communication) system, the receive filter 276 would pass all frequencies from approximately 925 MHz to 960 MHz, covering 175 channels of 200 kHz each. The purpose of this filter is to reject all frequencies outside the desired region. The LNA 280 amplifies the received signal on connection 278 to a level at which a downconverter 284 can translate the signal from the transmitted frequency to an IF frequency. Alternatively, the functionality of the LNA 280 and the downconverter 284 can be accomplished using other elements, such as, for example but not limited to, a low noise block downconverter (LNB).

The downconverter 284 receives a frequency reference signal, also called a "local oscillator" signal, or "LO", from a UHF voltage-controlled oscillator (VCO, not shown) of the polar-loop circuit 250 via connection 270, which signal instructs the downconverter 284 as to the proper frequency to which to downconvert the signal received from the LNA 280 via connection 282. The downconverted frequency is called the intermediate frequency or IF. The downconverter 284 sends the downconverted signal via connection 286 to a channel filter 288, also called an "IF filter." The channel filter 288 filters the downconverted signal and supplies it via connection 290 to an amplifier 292. The channel filter 288 selects the one desired channel and rejects all others. Using the GSM system as an example, only one of the contiguous channels is actually to be received. After all channels are passed by the receive filter 276 and downconverted in frequency by the downconverter 284, only the one desired channel will appear precisely at the center frequency of the channel filter 288. An oscillator (not shown), or its equivalent, determines the selected channel by controlling the local oscillator frequency supplied on connection 270 to the downconverter 284. The amplifier 292 amplifies the received signal and supplies the amplified signal via connection 294 to a demodulator 296. The demodulator 296 recovers the transmitted analog information and supplies a signal representing this information via connection 298 to the ADC 232. The ADC 232 converts these analog signals to a digital signal at baseband and transfers the signal via bus 228 to the DSP 224 for further processing. As an alternative, the downconverted RF frequency at connection 286 may be 0 Hz, in which case the receiver is referred to as a "direct conversion receiver." In such a case, the channel filter 288 is implemented as a low-pass filter, and the demodulator 296 may be omitted.

Figure 3:
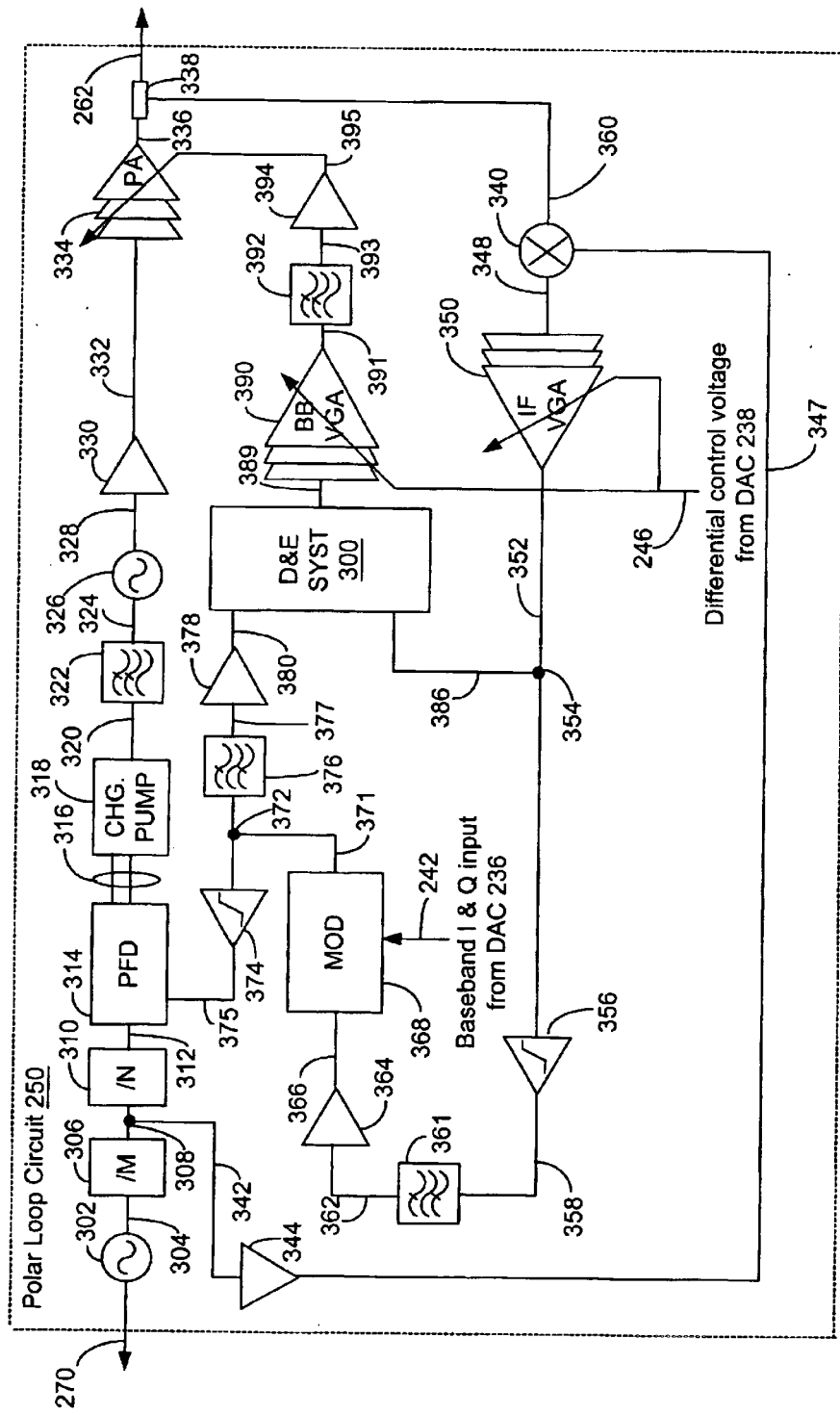
FIG. 3 is a block diagram of an embodiment of a transmitting section for the portable transceiver shown in FIG. 2.

FIG. 3 is a block diagram of the polar-loop circuit 250 that comprises the transmitter portion for the portable transceiver 200 shown in FIG. 2. The polar-loop circuit 250 includes phase and amplitude information carried over a phase loop and an amplitude loop. A power amplifier in a modulation arrangement that uses the polar-loop circuit 250 has the amplitude and phase information applied differently to the power amplifier. The phase information is applied to an input port of the power amplifier, where it is amplified and output over an output connection. The amplitude information is used to control the gain of the power amplifier, and is provided to a gain control port of the power amplifier. The power amplifier thus receives an input of changing phase or frequency, but constant amplitude. The control for the power amplifier occurs via a variable amplitude signal applied to the gain control port of the power amplifier, resulting in a varying amplitude signal output for the power amplifier. The phase loop includes a path that has the following components: a UHF voltage controlled oscillator (VCO) 302, dividers 306 and 310, a phase-frequency detector (PFD) 314, a charge pump 318, a low-pass filter (LPF) filter 322, a transmitter VCO 326, a buffer 330, a power amplifier 334, a coupler 338, a mixer 340, an IF variable gain amplifier (VGA) 350, limiters 356 and 374, a filter 361, an IF buffer 364, and a baseband (BB) modulator 368.

The amplitude loop includes the above components indicated for the phase loop (except for the limiter 374), filters 376 and 392, an amplifier 378, a detection/error extraction system 300, a BB VGA 390, and a buffer 394. Note that some embodiments may have fewer or different components for the amplitude or phase loops.

Starting with the phase loop of the polar-loop circuit 250, the UHF VCO 302 provides a frequency reference signal, also called a "local oscillator" signal, or "LO," on connection 304. The frequency reference signal on connection 304 is divided by a predetermined number M at divider 306. The signal at node 308 is further divided by a predetermined number N at divider 310. The signal at node 308 is also provided to the "LO" buffer 344, as explained below. The dividers 306 and 310 delineate frequency values from the UHF VCO 302 to create transmission channels for a particular user of the portable transceiver 200 (FIG. 2). The UHF VCO 302 also provides control signals to the downconverter 284 of FIG. 2 via connection 270.

The divider 310 outputs a signal to the PFD 314 over connection 312. The detected signal is then supplied over connection 316 to the charge pump 318. The charge pump 318 outputs a signal over connection 320 to the low-pass filter 322, where the filtered signal is applied to a transmit VCO 326 via connection 324. The transmit VCO 326 modulates the phase or frequency of the signal on connection 324. The signal output from the transmit VCO 326 over connection 328 is buffered at the buffer 330, and then the buffered signal is supplied over connection 332 to the input of the power amplifier 334.

The output signal of the power amplifier 334 is applied to the coupler 338 via connection 336. A portion of the phase or frequency information from the signal at the coupler 338 is fed back over connection 360 to the mixer 340. The remainder of the energy from the signal at the coupler 338 is supplied to the switch 274 (FIG. 2) via connection 262. The signal from the switch 274 is supplied to the antenna 272 (FIG. 2) for transmission.

The mixer 340 also receives a buffered, divided by M signal from the UHF VCO 302, which acts as a local oscillator for the mixer 340 to mix the RF signal at the power amplifier output down to an IF signal. That is, part of the divided by M signal at node 308 is supplied over connection 342 to the "LO" buffer 344. The buffered signal on connection 347 is then supplied to the mixer 340. The RF signal on connection 360 is mixed down to the IF at the mixer 340 and supplied to the IF VGA 350 via connection 348. Connection 246 provides variable control input signals to the IF VGA 350 and the BB VGA 390. The gain of the IF VGA 350 and the BB VGA 390 can be adjusted by varying the gain control signal applied to the connection 246.

The output signal of the IF VGA 350 on connection 352 is applied to two different paths from node 354. Following a first path, the signal leaving node 354 is input to the limiter 356, which strips the amplitude information from the IF signal output from the IF VGA 350. The output signal of the limiter 356 is then supplied on connection 358 to the filter 361, which provides bandpass and/or low-pass filtering functionality. The filtered signal output from the filter 361 is supplied over connection 362 and buffered at the IF buffer 364. The IF buffer 364 outputs the buffered signal over connection 366 to the BB modulator 368. The BB modulator 368 modulates baseband I and Q signals input (via connection 242) to the BB modulator 368 and upconverts the modulated signals carrying the baseband information. For example, in systems conforming to EDGE standards, phase and amplitude information is varied according to a π/8 differential phase-shift keying (DPSK) modulation methodology, thus placing stringent requirements for linearity in power amplification. The baseband I and Q information is provided from DAC 236 (FIG. 2) over connection 242. The modulated signal is supplied over connection 371 to node 372, where two signal paths are available. Continuing with the phase loop, the modulated signal at node 372 is supplied to the limiter 374, and then back to the PFD 314 via connection 375 to close the phase loop.

Referring now to the amplitude loop, the signal at node 372 is supplied to the bandpass filter 376 and includes both amplitude and phase information (from the modulator 368). The output signal of the bandpass filter 376 is supplied over connection 377 to amplifier 378. The amplifier 378 amplifies the signal on connection 377 and provides an output signal over connection 380 to the detection/error extraction system 300. The detection/error extraction system 300 detects the envelope of the amplitude information present on connection 380, and derives a reference signal that will be subtracted from the IF signal provided by the IF VGA 350.

Similarly, the output signal of the IF VGA 350 present at node 354 is supplied to the detection/error extraction system 300 over connection 386. The detection/error extraction system 300 strips the phase or frequency information from the signals on connections 386, leaving only the amplitude information, thus deriving a feedback signal. The feedback signal and the reference signal are compared in the detection/error extraction system 300, and responsively, an error signal is generated and provided over connection 389. The error signal on connection 389 is input to the BB VGA 390, which amplifies the error signal on connection 389. The amplified signal on connection 391 is filtered at filter 392, and then supplied over connection 393 to buffer 394. The buffer 394 outputs the buffered signal to the power amplifier 334 via gain control connection 395, thus effecting a change in gain of the power amplifier 334.

Thus, the power amplifier 334 receives a signal via connection 332 having constant amplitude information but changing phase or frequency information due primarily to the transmitter VCO 326. However, the output signal of the power amplifier 334 has a variable amplitude, and that variation results from the variation present at the gain control connection 395 corresponding to the variable amplitude information of the output signal of the BB VGA 390. Connection 246 carries the control signals produced at DAC 238 (FIG. 2) to control the IF VGA 350 and BB VGA 390.

Figure 4:
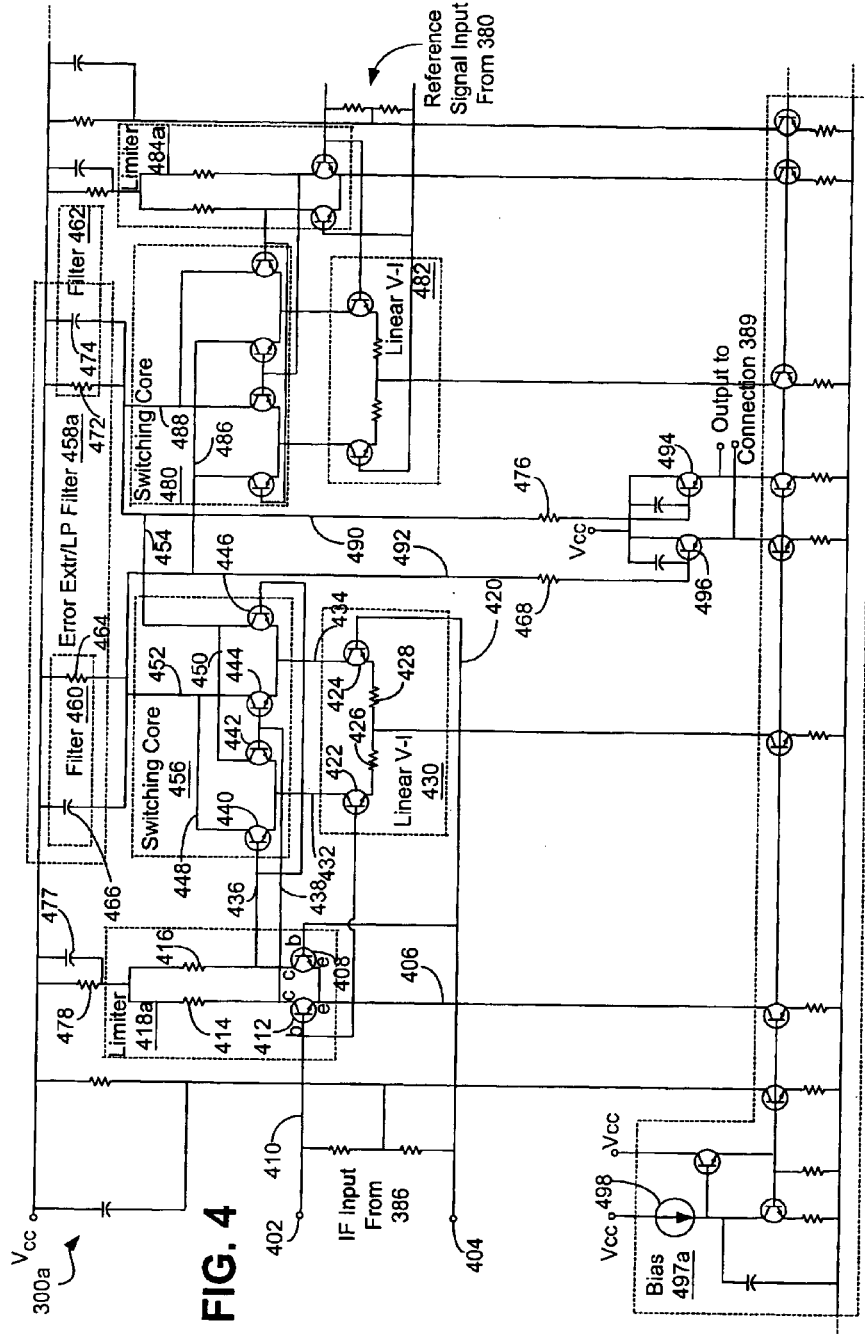
FIG. 4 is a schematic diagram illustrating one embodiment of the detection/error extraction system shown in FIG. 3.

FIG. 4 is a simplified schematic diagram illustrating one embodiment of the detection/error extraction system 300 shown in FIG. 3. Although shown using n-type, p-type, n-type (NPN) bipolar junction transistors (BJTs), p-type, n-type, p-type (PNP) BJTs can be used in other embodiments, as well as other transistors such as heterojunction bipolar transistors (HBTs), junction field-effect transistors (JFETs), and metal-oxide field-effect transistors (MOSFETs), and the like. Further, although described in the context of receiving an IF signal as the feedback signal from the IF VGA 350 (FIG. 3), signals of other frequency ranges, such as RF, are also included. Note that there is symmetry in structure and functionality on each side of an imaginary line drawn vertically from the output circuitry shown at the lower portion of the schematic diagram (see transistors 496 and 494 for an approximate location of the imaginary line). The left-hand side of that imaginary line includes circuitry for processing the IF input signal (the feedback signal on connection 386 from the IF VGA 350, FIG. 3), and the right-hand side of the imaginary line includes circuitry for processing the reference signal (e.g., the reference signal sourced from the I/Q modulator 368 and passed through filter 376 and amplifier 378 to connection 380, FIG. 3). The description that follows will focus on structure and corresponding functionality on the left-hand side to simplify the discussion, with the understanding that there is similarity in structure and function between elements on the left-hand side and the right-hand side.

The left-hand side elements of the detection/error extraction system 300a provide for IF signal processing functionality (e.g., the feedback signal). The left-hand side of the detection/error extraction system 300a includes a limiter element 418a, a linear voltage to current (V-I) element 430, a switching-core element 456, and an error extraction/low-pass (LP) filter element 458a. Similarly structured elements are mirrored on the right-hand side for the reference signal processing functionality. The IF signal is received over connection 386 (FIG. 3) from the output of the IF VGA 350 (FIG. 3). The IF signal is provided to the limiter element 418a. The limiter element 418a includes transistors 412 and 408 and resistors 414 and 416. Transistors described herein each include a base terminal (labeled "b" on transistors 408 and 412 as representative examples), an emitter terminal (labeled "e" on transistors 408 and 412 as representative examples), and a collector terminal (labeled "c" on transistors 408 and 412 as representative examples). The emitter terminals of transistors 412 and 408 are commonly connected to the bias circuit 497a via connection 406, and thus referenced to ground.

The bias circuit 497a includes a current source 498 that provides a DC current to the plurality of transistors of the bias circuit 497a that are configured in a current mirror configuration.

The collector terminals of transistors 412 and 408 are respectively coupled to resistors 414 and 416, which in turn are coupled to a voltage source, Vcc, via resistor 478 and capacitor 477.

The limiter element 418a strips off the amplitude variation of the F signal, which can vary by approximately 20 decibels (dB). As is well known, a time-varying signal such as a sine wave applied to a limiter can result in clipping of the positive and negative peaks of the sine wave. Thus, the limiter element 418a provides a "clipping" function, wherein a defined portion of the received signal-amplitude peaks are "clipped" off, resulting in an approximation of a square wave that retains the phase of the IF signal. A limiter element 484a provides similar functionality for a received reference signal on the right-hand side of the detection/error extraction system 300a. The limiter elements 418a and 484a are configured to provide crisp or sharp edges (e.g., square wave edges that resemble a square more than a trapezoid) with low AM-to-PM distortion (e.g., over 20 dB amplitude variation) to avoid out-of-phase multiplication when performing synchronous detection at the mixing stage, as described below. Linearity is improved when there is "alignment" between the generated square wave and the input sine wave. Out-of-phase mixing, which can occur when edges are not sharp, when there is large AM-to-PM distortion, and/or when there is delay between the limiter signal path and the path that leads directly to the linear V-I element 430 (described below), often results in a phase error that is further exacerbated with variations in the input signal amplitude.

The IF signal received at connections 402 and 404 are also provided over connections 410 and 420 to the linear V-I element 430. The linear V-I element 430 includes transistors 422 and 424 and resistors 426 and 428. The emitter terminal of transistor 422 is coupled to the bias circuit 497a through resistor 426. Similarly, the emitter terminal of transistor 424 is coupled to the bias circuit 497a through resistor 428. The linear V-I element 430 converts the input IF voltage signal to a current signal.

The current signal is provided from the collector terminals of transistors 422 and 424, over respective connections 432 and 434, to the switching-core element 456. The switching-core element 456 also receives the square-wave signal from the limiter element 418a over connections 436 and 438. The switching-core element 456 includes differential pair transistors 440 and 442, and differential pair transistors 444 and 446. Transistors 440 and 444 include commonly connected collector terminals that converge at connection 452. Transistors 442 and 446 include commonly connected collector terminals that converge at connection 454. Transistor pairs 440 and 442 include commonly connected emitter terminals that couple the switching-core element 456 to the linear V-I element 430 over connection 432. Transistor pairs 444 and 446 include commonly connected emitter terminals that couple the switching-core element 456 to the linear V-I element 430 over connection 434. The linear V-I element 430 and the switching-core element 456 together provide a mixer function for the detection/error extraction system 300a.

The limiter element 418a provides the chopping square-wave signal with an amplitude that varies in magnitude between plus and minus a defined voltage, for example one volt. The signal provided to the switching-core element 456 through the linear V-I element 430, in contrast, has an amplitude variation that is retained from the input terminals 402 and 404. The two signals (e.g., chopped or square wave, and the current sinusoidal wave) are in phase, and multiplied together to provide a mixed output signal that has a similar configuration to a signal that has been full-wave rectified. Thus, the mixed output signal on connections 452 and 454 represent a full-wave rectified signal, but via synchronous detection (e.g., through the use of a synchronous chopping signal). A linear V-I element 482 and switching-core element 480 are shown on the right-hand side of the detection/error extraction system 300a, with similar functionality and structure as the counterpart circuitry found on the left-hand side.

The mixed output signal is provided over output connections 452 and 454 to the error extraction/LP filter element 458a. The right-hand side components of the error extraction/LP filter element 458a will be described along with the left-hand side components. The error extraction/LP filter element 458a includes two resistor-capacitor (RC) filters 460 and 462. RC filter 460 includes resistor 464 and capacitor 466. RC filter 462 includes resistor 472 and capacitor 474. Resistors 464 and 472 comprise a differential resistor. The output signals of the switching-core elements 456 and 480 are cross-coupled in a manner as shown, which enables the subtraction between full-wave rectification current signals associated with the input IF signal and the reference signal. Thus, the limiter elements 418a and 484a remove the envelope variation of the reference and IF signals. The linear V-I elements 430 and 482 and switching-core elements 456 and 480 provide for synchronous detection and conversion to DC current. The output signals of the switching-core elements 456 and 480 are configured to provide subtraction of the rectified current signals in the error extraction/LP filter element 458a.

The differential resistor comprised of resistors 464 and 472 of the error extraction/LP filter element 458a converts the current provided to the error extraction/LP filter element 458a over connections 452, 454, 486, and 488 to voltage. In general, error extraction is performed in the current-domain by subtracting the currents of the two switching-core elements 456 and 480. The resulting current passes through the differential resistor comprised of resistors 464 and 472, creating a voltage from the current-resistance (IR) drop. The error extraction/LP filter element 458a also provides low-pass filtering of the signal received from the switching-core elements 456 and 480. DC offset caused by the mismatch of components of the detection/error extraction system 300a, except for the differential resistor comprising resistors 464 and 472 of the error extraction/LP filter element 458a, is upconverted in frequency. The mismatch due to the differential resistor comprising resistors 464 and 472 remains. Thus, DC offset of the detection/error extraction system 300*a* is generally the result of mismatch between the two resistors 464 and 472. Stated differently, the DC offset of the entire detection/error extraction system 300*a* is generally determined by the matching of the differential resistor comprising resistors 464 and 472. As will be described in association with FIG. 6, having low DC offset enables the detection of low-amplitude signals, which is specified in some modulation methodologies such as EDGE, among others.

Mismatch among the two resistors 464 and 472 has a statistical variation that is inversely proportional to the area of the resistors. By relying primarily on the differential resistor comprising resistors 464 and 472, as opposed to several components, the area consumed by the resistors 464 and 472 can be made large with little effect on the total area used for the detection/error extraction system 300*a*. Resistance of a resistor is a function of a constant (the sheet resistance constant), multiplied by the length (l) of the resistor divided by the width (w) of the resistor. The area of a resistor is the width (w) of the resistor multiplied by the length (l) of the resistor. Changes in the area of the resistor can be achieved while maintaining substantially the same resistance.

For example, for a desired resistance of 10 kilo-ohms (k$\Omega$), assuming a sheet resistance constant of 1 k$\Omega$, a designer can choose a length (l) of 10 micrometers ($\mu$m) and a width (w) of 1 $\mu$m (resistance=l/w×l=$^{10}/_{1}$=10 k$\Omega$; area=l× w=10×1=10 $\mu$m$^2$). However, by providing a larger area for the same resistance value of 10 k$\Omega$, mismatch is averaged over a larger area, resulting in a lower DC offset. For example, the designer can use a resistor length (l) of 100 $\mu$m and a width (w) of 10 $\mu$m, resulting in the same resistance value of 10 k$\Omega$ using a resistor having one hundred times the area (resistance=l/w×l=$^{100}/_{10}$=10 k$\Omega$; area=l×w=100×10= 1000 $\mu$m$^2$). This solution of reducing DC offset by using larger area resistors can be applied practically when DC offset is primarily determined on a limited number of components, such as a differential resistor (e.g., resistors 464 and 472). Increasing the area of a larger number of components to address DC offset can be impractical to implement.

Further, the detection/error extraction system 300*a* (and 300*b* as discussed below) merges detection and error extraction functionality, and obviates the need for digital or analog DC correction circuitry. Thus, despite the added resistor area to average out the mismatch caused by the differential resistor comprising resistors 464 and 472, there can also be a reduction in overall size when compared to conventional systems.

In addition, the greater reliance on linear elements (e.g., resistors) in controlling DC offset also enables improved linearity at low-signal levels when compared to conventional approaches (e.g., diode rectification).

Note that in some embodiments, differential resistors 464 and 472 can be replaced with three terminal devices acting as resistive elements, such as p-channel metal-oxide semiconductor (PMOS) transistors, wherein the matching is then performed with transistors versus resistors.

The voltage signal delivered from the error extraction/LP filter element 458*a* is delivered over connections 490 and 492 to resistors 476 and 468, which in turn provides a voltage signal to transistors 494 and 496. The output signal over connection 389 (FIG. 3) to the BB VGA 390 (FIG. 3) is provided at the emitter terminals of transistors 494 and 496.

Figure 5:
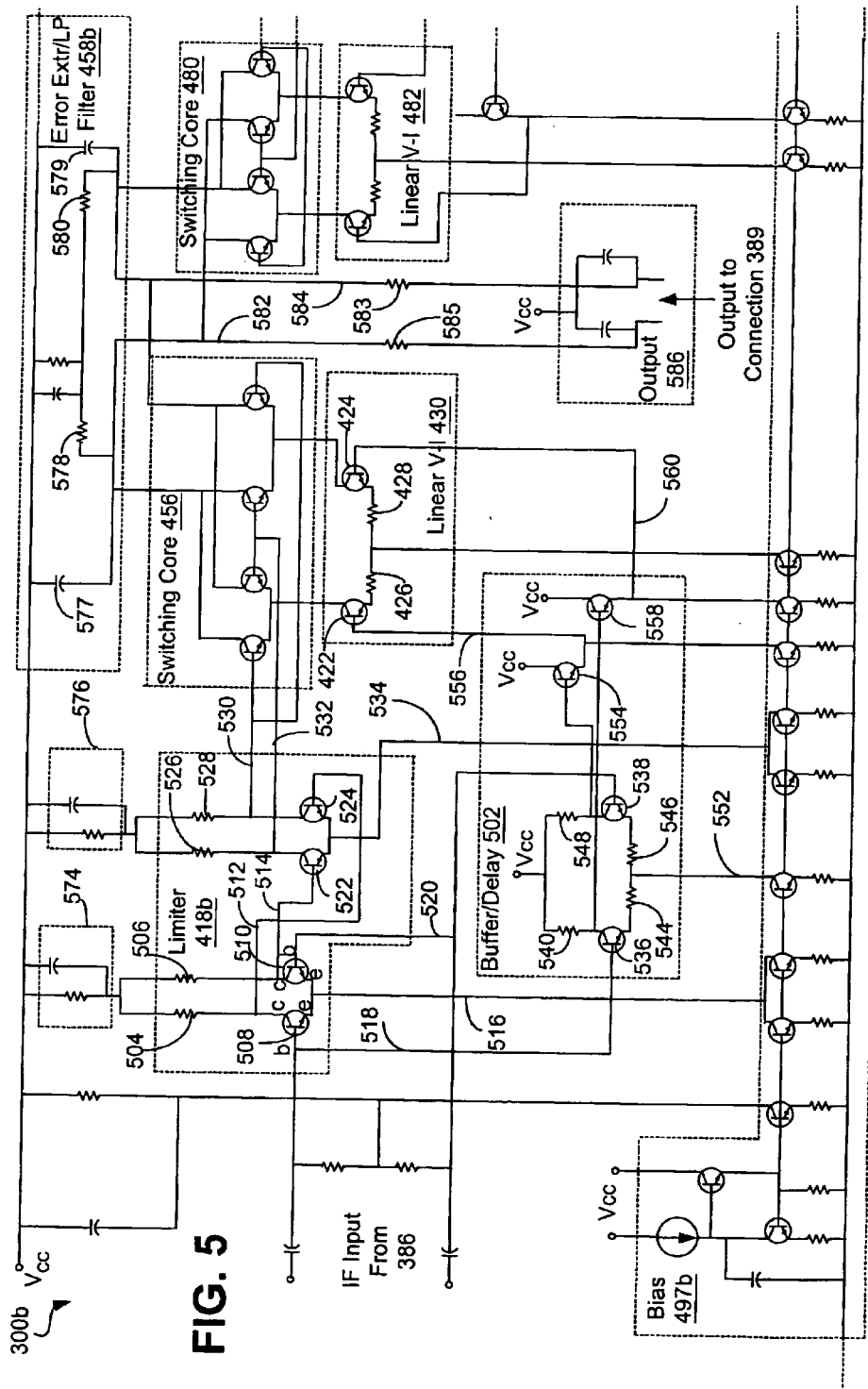
FIG. 5 is a schematic diagram illustrating another embodiment of the detection/error extraction system shown in FIG. 3.

FIG. 5 is a schematic diagram illustrating another embodiment of the detection/error extraction system 300 shown in FIG. 3. Drawing an imaginary line vertically from between the capacitors of the output circuit 586, components of the detection/error extraction system 300*b* are symmetrical in structure and function (except for the current source portion of the bias circuit 497*b*). For simplicity in discussion, the left-hand side of the aforementioned imaginary line will be described and the discussion of the right-hand side omitted except where appropriate. Similar to the structure of the detection/error extraction system 300*a* of FIG. 4, the detection/error extraction system 300*b* includes a limiter element 418*b* (and a corresponding limiter element not shown for the right-hand side), switching-core elements 456 and 480, linear V-I elements 430 and 482, and an error extraction/LP filter element 458*b*. Note that in the embodiment shown, the limiter element 418*b* uses two cascaded stages, as opposed to the single-stage limiter element 418*a* (and 482*a*) of FIG. 4.

Low AM-to-PM conversion is facilitated using two or more stages, especially with large amplitude variations in the input signal. Each stage carries out a portion of the limiting function performed by the limiter element 418*b*. As shown, the limiter element 418*b* includes a first stage comprising transistors 508 and 510 that are connected at the emitter terminals (designated "e", as described in association with FIG. 4). The emitter terminals of transistors 508 and 510 are connected to bias circuit 497*b* via connection 516, providing a reference to ground. The collector terminals (designated "c") of transistors 508 and 510 are connected to RC circuit 574 through resistors 504 and 506, respectively. The RC circuit 574 is coupled to Vcc. The base terminals (designated "b") of transistors 508 and 510 are coupled to a linear buffer & delay element 502 via connections 518 and 520, respectively.

The output signal of the first stage at the collector terminals of transistors 508 and 510 is provided over connections 512 and 514 to a second stage for further limiting. The second stage is comprised of transistors 522 and 524 and resistors 526 and 528. The output signal of the first stage is provided over connections 512 and 514 to the base terminals of transistors 522 and 524 respectively. Similar to the first stage, the transistors 522 and 524 are commonly connected at the emitter terminals, which are connected to the bias circuit 497*b* via connection 534. The collector terminals of transistors 522 and 524 are coupled to RC filter 576 via resistors 526 and 528. The RC filter 576 is coupled to Vcc. The output signal of transistors 522 and 524 is provided over connections 530 and 532 to the switching-core element 456 in a manner as described for the switching-core element 456 in FIG. 4.

The linear buffer & delay element 502 has a counterpart element on the right-hand side (not shown). The linear buffer & delay element 502 comprises transistor pairs 536 and 538, resistors 540, 544, 546, and 548, and transistors 554 and 558. The emitters of transistors 536 and 538 are coupled to the bias circuit 497*b* through resistors 544 and 546 over connection 552. The collector terminals of transistors 536 and 538 are coupled to Vcc via resistors 540 and 548, respectively. The gain of the transistors 536 and 538 are a function of the resistive load at the respective collector terminals to the resistor load at the respective emitter terminals. The output signal provided over the collector terminal of transistors 536 and 538 are provided to the base terminals of transistors 554 and 558 respectively. The collector terminals of transistors 554 and 558 are coupled to Vcc. The emitter terminals of transistors 554 and 558 are coupled to the linear V-I element 430 via connections 556 and 560, respectively. Thus, the delayed signal from the linear buffer & delay element 502 is output from the emitter terminals of transistors 554 and 558 over connections 556 and 560 to the linear V-I element 430.

The linear buffer & delay element 502 delays the input signal received over connection 386 (FIG. 3). It is desired to have the phase of the signal, received at the input to the linear V-I element 430 at connections 556 and 560, to be the same as the phase received at the switching-core element 456 (at connections 530 and 532). The linear buffer & delay element 502 helps ensure this desired phase relationship. A designer can determine whether the limiter element 418b is delaying the signal or not, and determine whether to omit or retain the linear buffer & delay element 502 (no appreciable delays) or retain in the detection/error extraction system 300b. Generally, if the frequency of operation of the detection/error extraction system 300b is very high (e.g., hundreds of MHz or more), the linear buffer & delay element 502 is used. If the frequency is lower (e.g., tens of MHz or less), the chopped or limited signal provided by the limiter element 418b will generally have an insignificant amount of delay, and thus the limiter element 418b can be omitted.

The linear V-I element 430 and 482 and the switching-core elements 456 and 480 are as described in association with FIG. 4.

The error extraction/LP filter 458b is similar in function to the error extraction/LP filter 458a described in association with FIG. 4. A differential resistor comprising resistors 578 and 580 provides a voltage from the subtracted currents provided from the switching-core elements 456 and 480. Capacitors 577 and 579 filter the signal components associated with switching frequency and corresponding harmonics found in other components of the detection/error extraction system 300b. The DC offset is generally determined from the mismatch in differential resistor groups 578 and 580. A solution for reducing DC offset is to increase the area of the differential resistor comprising resistors 578 and 580, similar to the reasoning described in association with FIG. 4.

The voltage delivered from the error extraction/LP filter element 458b is delivered over connections 582 and 584 to resistors 583 and 585, which in turn provides a voltage to output circuit 586. The output signal is provided over connection 389 (FIG. 3) to the BB VGA 390 (FIG. 3).

FIG. 6 is a chart illustrating the DC offset contribution from the detection/error extraction system 300b (including the left and right-hand side elements) shown in FIG. 5, which similarly applies to like-components of the detection/error extraction system 300a of FIG. 4. Assume, in this example, that the target, or design DC offset is 3 mV. As is well-known in the art, the area of a resistor can be selected from graphs provided by component manufacturers based on the desired matching. The example values are based on testing using defined values that can vary depending on the application and desired performance, and are shown here as one example among many. Column 602 corresponds to the component or components of the detection/error extraction system 300b that have been tested. Column 604 corresponds to the amount of mismatch found in the component tested, based on the well-known 3-sigma mismatch (e.g., well-known Gaussian distributions for mismatch with a mean equal to zero). Mismatch can be described in terms of a percentage of mismatch or in units of millivolts (mV). Column 606 corresponds to the amount of DC offset observed in the tested component, in units of mV. Column 608 corresponds to the squared DC offset value of column 606.

As shown in column 602, row 610, the RLOAD corresponds to the differential resistor comprising resistors 578 and 580 of the error extraction/LP filter 458b (FIG. 5). The design area (e.g., l×w) is 40,000 $\mu$m per resistor group. The rated mismatch for these resistors, based on fabrication data, is 0.1%, as shown in column 604, row 610. As described above, matching improves as the resistor area increases. The resistor areas can be selected from graphs provided by manufacturers based on the desired matching.

Column 606, row 610 represents that if the differential resistor comprised resistors with values that were chosen to have 0.1% mismatch, the DC offset created by this mismatch for the detection/error extraction system 300a (FIG. 3) is 0.7 mV.

Column 602, row 612 includes the transistors of the switching-cores 456 and 480. There are four total pairs of transistors for the left and right-hand side switching-cores that have a Vbe manufacturing mismatch rating totaling 0.6 mV, as shown in Column 604, row 612. When translated into DC offset (column 606, row 612), the DC offset is 0.7 mV at the output of output circuit 586 (FIG. 5).

Column 602, row 614 shows the component to be tested as the resistors at the emitter terminals of the transistors of the linear V-I elements 430 and 482. From fabrication data, the mismatch is 0.50% (column 604, row 614), and the DC offset caused by the mismatch is 0.098 mV (column 606, row 614).

Column 602, row 616 corresponds to the resistors of the linear buffer & delay element 502 (FIG. 5) (and corresponding right-hand side element, not shown). The mismatch is 0.50% (column 604, row 616), which translates to 0.15 mV DC offset.

Column 602, row 618 corresponds to the output buffer Vbe of the linear buffer & delay element transistors 554 and 558 (FIG. 5) (and those not shown for the corresponding right-hand side element), which has a mismatch of 0.6 mV (column 604, row 618) and a corresponding DC offset of 0.07 mV (column 606, row 618).

Column 602, rows 620 and 622 correspond to the resistors and the input Vbe of the transistors, respectively, of the limiter elements 418b (FIG. 5) and corresponding element on the right-hand side (not shown). Referring to the resistors, the mismatch is 6 mV (column 604, row 620), which corresponds to a DC offset of 0.02 mV (column 606, row 620). Referring to the input Vbe of the transistors, the mismatch is 1.8 mV (column 604, row 622), corresponding to a DC offset of 0.03 mV (column 606, row 622).

Since the mismatch of these components of the detection/error extraction system 300b are uncorrelated, the root mean square (RMS) sum is taken, as is well known in the art. Thus, column 608, rows 610–622 represent the squared values in units of $mV^2$ of the DC offset. The summation of these squared values is shown in column 608, row 624, and then the square root is provided in column 608, row 626. As shown, the primary contributor of DC offset is the differential resistor comprising resistors 578 and 580 of the detection/error extraction system 300b. The second highest contributor to DC offset are the switching-core elements 456 and 480. The balance of the components contribute negligibly to the DC offset.

In a system where the detection level is a low value, for example 30 mV peak-to-peak signal input, the detection/error extraction system 300b provides an output signal of 32 mV (30 mV input plus 1 mV contribution from the left-hand side and approximately 1 mV contribution from the symmetrical right-hand side). In other words, the minimum input signal is much larger than the DC offset. As another example, EDGE modulation systems require that the DC offset be ten times less than the minimum input-signal level. As described above, with a minimum input-signal level of 30 mV, a DC offset of ten times less would be thirty divided by ten (30/10), or 3 mV. Thus, the requirement for EDGE systems with a 30 mV input would be a DC offset less than 3 mV, which is met by the 1 mV DC offset contribution as described above for one particular design example.

Conventional systems use separate entities for amplitude detection and error extraction, often resulting in a total DC offset that is considerably higher than the DC offset found in the detection/error extraction system 300b (or 300a). When a low-level input signal is detected, the contribution of DC offset can often cause the minimum input signal to be below the DC offset, resulting in a loss of information.

While various embodiments of the invention have been described, it will be apparent to those of ordinary skill in the art that many more embodiments and implementations are possible that are within the scope of this invention. Accordingly, the invention is not to be restricted except in light of the following claims and their equivalents.

What is claimed is:

1. A method for envelope detection and extraction, said method including:
   providing a first chopping signal derived from a first signal;
   removing amplitude variation from the first signal without substantially disturbing a phase relationship between the first signal and the first chopping signal; and
   multiplying the first signal with the first chopping signal to produce a first rectified signal and to upconvert in frequency a first direct current offset from mismatch corresponding to providing the first chopping signal, removing amplitude variation from the first signal, and multiplying the first signal.

2. The method of claim 1, further including filtering out the first direct current offset.

3. The method of claim 2, further including:
   providing a second chopping signal derived from a second signal;
   removing amplitude variation from the second signal without substantially disturbing a phase relationship between the second signal and the second chopping signal; and
   multiplying the second signal with the second chopping signal to produce a second rectified signal and to upconvert in frequency a second direct current offset from mismatch corresponding to removing amplitude variation from the second signal, providing the second chopping signal, and multiplying the second signal.

4. The method of claim 3, further including filtering out the second direct current offset.

5. The method of claim 4, wherein multiplying the second signal includes converting the second signal from a voltage signal to a current signal.

6. The method of claim 5, further including comparing the first rectified signal with the second rectified signal to provide a difference signal, such that the difference signal includes a system direct current offset corresponding to a differential resistor.

7. The method of claim 3, further including delaying the second signal so that a difference in phase between the second chopping signal and the delayed second signal reduces substantially towards zero.

8. The method of claim 1, further including delaying the first signal so that a difference in phase between the first chopping signal and the delayed first signal reduces substantially towards zero.

9. The method of claim 1, wherein multiplying includes converting the first signal from a voltage signal to a current signal.

10. A system for envelope detection and extraction, the system including:
    a first limiter configured to produce a first chopping signal from a first signal, wherein the first limiter is further configured to remove amplitude variation from the first signal without substantially disturbing a phase relationship between the first signal and the first chopping signal; and
    a first mixer coupled to the first limiter, the first mixer configured to multiply the first signal with the first chopping signal to produce a first rectified signal and to upconvert in frequency a first direct current offset from mismatch corresponding to the first limiter and the first mixer.

11. The system of claim 10, further including an extractor element coupled to the first mixer, the extractor element configured to filter out the first direct current offset.

12. The system of claim 11, further including:
    a second limiter configured to provide a second chopping signal derived from a second signal, wherein the second limiter is further configured to remove amplitude variation from a second signal without substantially disturbing a phase relationship between the second signal and the second chopping signal; and
    a second mixer coupled to the second limiter, the second mixer configured to multiply the second signal with the second chopping signal to produce a second rectified signal and to upconvert in frequency a second direct current offset from mismatch corresponding to the second mixer and the second limiter.

13. The system of claim 12, wherein the extractor element is coupled to the second mixer, wherein the extractor element is further configured to filter out the second direct current offset.

14. The system of claim 13, wherein the second mixer is further configured to convert the second signal from a voltage signal to a current signal.

15. The system of claim 14, wherein the extractor element includes a differential resistor.

16. The system of claim 15, wherein the extractor element is configured to compare the first rectified signal with the second rectified signal to provide a difference signal across the differential resistor, such that the difference signal includes a system direct current offset corresponding to mismatch of the differential resistor.

17. The system of claim 12, further including a second delay element coupled to the second limiter and the second mixer, the second delay element configured to delay the second signal so that a difference in phase between the second chopping signal and the delayed second signal reduces substantially towards zero.

18. The system of claim 10, further including a second stage limiter coupled between at least one of the first limiter and the first mixer and a second limiter and a second mixer.

19. The system of claim 10, wherein the first mixer is further configured to convert the first signal from a voltage signal to a current signal.

20. The system of claim 10, wherein the first mixer includes a linear voltage-to-current element having at least one differential pair transistor, and a switching-core having differential pair transistors coupled to an output of the at least one differential pair transistor of the linear voltage-to-current element.

21. The system of claim 10, further including a second mixer and a second limiter configured substantially similar to the first mixer and the first limiter.

22. The system of claim 10, further including a first delay element coupled to the first limiter and the first mixer, the first delay element configured to delay the first signal so that a difference in phase between the first chopping signal and the delayed first signal reduces substantially towards zero.

23. The system of claim 10, wherein the first limiter is further configured to provide at least one of low AM-to-PM (amplitude modulation to phase modulation) distortion and sharp square-wave edges.

24. A system for envelope detection and extraction, the system including:

means for providing a chopping signal derived from a signal;

means for removing amplitude variation from the signal without substantially disturbing a phase relationship between the signal and the chopping signal; and means for multiplying the signal with the chopping signal to produce a rectified signal and to upconvert in frequency a direct current offset from mismatch corresponding to the means for providing the chopping signal, the means for removing amplitude variation from the signal, and the means for multiplying the signal.

25. The system of claim 24, further including means for filtering out the direct current offset, such that a system direct current offset is primarily determined by a differential resistor included in the system.

* * * * *